United States Patent
Matsukura (10) Patent No.: US 10,976,719 B2
(45) Date of Patent: Apr. 13, 2021

(54) PARAMETER SETTING SUPPORT DEVICE

(71) Applicant: FANUC Corporation, Yamanashi (JP)

(72) Inventor: Sadao Matsukura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/045,952

(22) Filed: Jul. 26, 2018

(65) Prior Publication Data

US 2019/0033825 A1   Jan. 31, 2019

(30) Foreign Application Priority Data

Jul. 26, 2017  (JP) .............................. JP2017-144073

(51) Int. Cl.
  *G05B 19/408*  (2006.01)
  *G05B 19/409*  (2006.01)

(52) U.S. Cl.
  CPC ........ *G05B 19/4083* (2013.01); *G05B 19/409* (2013.01); *G05B 2219/31103* (2013.01); *G05B 2219/35026* (2013.01); *G05B 2219/35285* (2013.01); *G05B 2219/36168* (2013.01)

(58) Field of Classification Search
  CPC ...... G05B 19/4083; G05B 2219/31103; G05B 2219/36168; G05B 2219/35026; G05B 2219/35285
  See application file for complete search history.

(56) References Cited

U.S. PATENT DOCUMENTS

| | | | | |
|---|---|---|---|---|
| 2002/0084763 A1* | 7/2002 | Shibukawa | ...... | G05B 19/40937 318/569 |
| 2004/0226921 A1* | 11/2004 | Picard | .................. | B23K 10/006 219/121.55 |
| 2005/0137727 A1* | 6/2005 | Feuerbach | ......... | G05B 19/0426 700/87 |
| 2010/0063608 A1* | 3/2010 | Miller | .................. | G05B 19/414 700/97 |
| 2011/0046766 A1* | 2/2011 | Mienhardt | ......... | G05B 19/4083 700/103 |

(Continued)

FOREIGN PATENT DOCUMENTS

| | | |
|---|---|---|
| CN | 103838202 A | 6/2014 |
| CN | 105652798 A | 6/2016 |

(Continued)

*Primary Examiner* — Jennifer L Norton
(74) *Attorney, Agent, or Firm* — Hauptman Ham, LLP (57) ABSTRACT

A parameter setting support device is provided with a parameter setting interface unit configured to display an input screen for setting a parameter of a function of a numerical controller and accept the setting of the value of the parameter of the function to be set, a related parameter identification unit configured to identify a related function related to the parameter of the settable function, based on the relationship between the parameter and each function of the numerical controller, and a setting range identification unit configured to identify a setting range of the parameter of the related function by calculating a conditional expression predetermined for the setting range of the parameter of the related function. The parameter setting interface unit displays the setting range of the parameter of the related function identified by the setting range identification unit.

5 Claims, 6 Drawing Sheets

(56) References Cited

U.S. PATENT DOCUMENTS

| | | | | |
|---|---|---|---|---|
| 2011/0068945 | A1* | 3/2011 | West | G09G 5/14 340/691.6 |
| 2012/0181969 | A1* | 7/2012 | Kohler | G05B 19/414 318/600 |
| 2014/0172148 | A1* | 6/2014 | Miller | G05B 19/414 700/183 |
| 2015/0051726 | A1* | 2/2015 | Euhus | G05B 19/4097 700/103 |
| 2015/0160647 | A1* | 6/2015 | Tezuka | G05B 19/416 318/600 |
| 2016/0154404 | A1 | 6/2016 | Saitou et al. | |
| 2016/0291582 | A1 | 10/2016 | Iwamura | |
| 2017/0300036 | A1* | 10/2017 | Maeda | G05B 19/0426 |
| 2019/0258219 | A1* | 8/2019 | Koga | B23Q 15/007 |
| 2019/0258224 | A1* | 8/2019 | Maeda | G05B 19/0426 |
| 2019/0324425 | A1* | 10/2019 | Oho | G05B 19/40937 |
| 2020/0073542 | A1* | 3/2020 | Sato | G06F 3/0484 |

FOREIGN PATENT DOCUMENTS

| | | |
|---|---|---|
| CN | 106054810 A | 10/2016 |
| CN | 106776712 A | 5/2017 |
| JP | H5-73103 A | 3/1993 |
| JP | H5-225190 | 9/1993 |
| JP | H5-233050 A | 9/1993 |
| JP | H9-62323 A | 3/1997 |
| JP | 2004-272422 A | 9/2004 |
| JP | 2004-280589 A | 10/2004 |
| JP | 2008-97409 A | 4/2008 |

\* cited by examiner

| FuncID (FUNCTION ID) | Param (PARAMETER NUMBER) | ValueID (SETTING RANGE ID) | Relation (RELATED FUNCTION ID) |
|---|---|---|---|
| F01 | 100 | V01 | F02 |
| F02 | 200 | V02 | - |

FIG. 4

| ValueID (SETTING RANGE ID) | CondID (CONDITIONAL EXPRESSION ID) | SETTING RANGE OF SET VALUE |
|---|---|---|
| V01 | C10 | 1~2 |
| V02 | C20 | 1~5 |
| V02 | C21 | 6~10 |

FIG. 5

| CondID (CONDITIONAL EXPRESSION ID) | Eval (CONDITIONAL EXPRESSION) | SUPPLEMENT |
|---|---|---|
| C10 | #OK | ALWAYS VALID |
| C20 | F01(100) = 1, #OK, #NG | VALID WHEN SET VALUE OF PARAMETER No. 100 OF FUNCTION F01 IS 1 |
| C21 | F01(100) = 2, #OK, #NG | VALID WHEN SET VALUE OF PARAMETER No. 100 OF FUNCTION F01 IS 2 |

FIG. 6

| FuncID (FUNCTION ID) | Param (PARAMETER NUMBER) | ValueID (SETTING RANGE ID) | Relation (RELATED FUNCTION ID) |
|---|---|---|---|
| F01 | V01 | 100 | F02 |
| F02 | V02 | 200 | - |
| F_GCODE | V_GCODE | 3401 | F_ANAME |
| F_ANAME | V_ANAME | 1020 | - |

FIG. 7

| ValueID (SETTING RANGE ID) | CondID (CONDITIONAL EXPRESSION ID) | SETTING RANGE OF SET VALUE |
|---|---|---|
| V01 | C10 | 1~2 |
| V02 | C20 | 1~5 |
| V02 | C21 | 6~10 |
| V_GCODE | C10 | (G-CODE SYSTEM A, G-CODE SYSTEM B, G-CODE SYSTEM C) |
| V_ANAME | C10 | (X-AXIS, Y-AXIS, Z-AXIS, A-AXIS, B-AXIS, C-AXIS) |
| V_ANAME | C_G_CODE_BC | (U-AXIS, V-AXIS, W-AXIS) |

FIG. 8

| CondID (CONDITIONAL EXPRESSION ID) | Eval (CONDITIONAL EXPRESSION) | SUPPLEMENT |
|---|---|---|
| C10 | #OK | ALWAYS VALID |
| C20 | F01(100) = 1, #OK, #NG | VALID WHEN SET VALUE OF PARAMETER No. 100 OF FUNCTION F01 IS 1 |
| C21 | F01(100) = 2, #OK, #NG | VALID WHEN SET VALUE OF PARAMETER No. 100 OF FUNCTION F01 IS 2 |
| C_G_CODE_BC | F_GCODE = "G-CODE SYSTEM B" or F_GCODE = "G-CODE SYSTEM C", #OK, #NG | U-, V- AND W-AXES ARE SELECTABLE WITH G-CODE SYSTEM B OR C |

FIG. 9

| VALUE OF No. 100 | SETTING RANGE OF NO. 200 RELATED TO VALUE OF No. 100 |
|---|---|
| 1 | 1~5 |
| 2 | 6~10 |

PARAMETER SETTING SUPPORT DEVICE

RELATED APPLICATIONS

The present application claims priority of Japanese Application Number 2017-144073, filed on Jul. 26, 2017, the disclosure of which is hereby incorporated by reference herein in its entirety.

BACKGROUND OF THE INVENTION

Field of the Invention

The present invention relates to a parameter setting support device, and more particularly, to a parameter setting support device having a function of performing a setting support based on the dependency of parameters.

Description of the Related Art

In order to operate a machine tool having a numerical controller built-in, it is necessary to set parameters for activating various functions. The parameters of the numerical controller are set by the following methods.

Method 1: The parameters are set on a parameter setting screen of the numerical controller.

Method 2: The parameters are created on a parameter setting screen of a personal computer tool and transferred to the numerical controller.

Figure 9:
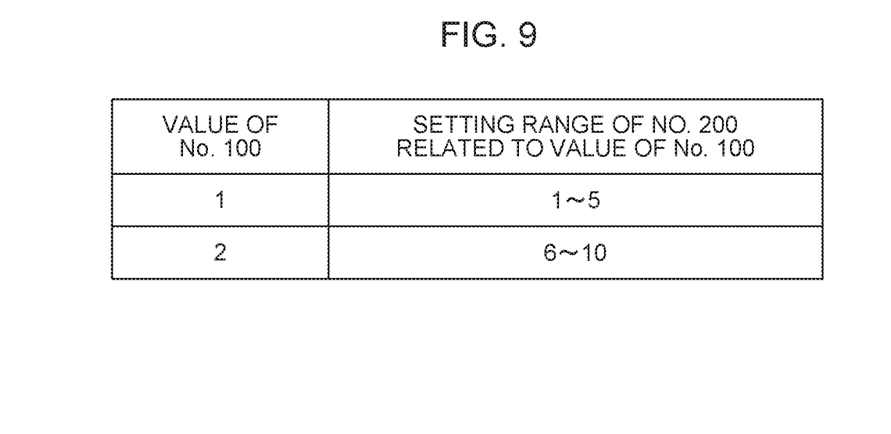
FIG. 9 is a diagram illustrating the relationship between a parameter of a numerical controller and a setting range of another parameters related to the parameter concerned.

Numerical controllers with more functions require setting of more parameters and each parameter has its own setting range. There are dependence relationships among the parameters. If one parameter is changed, some other parameters related to this parameter may sometimes be expected to be changed. Moreover, as shown in FIG. 9, among parameters having dependency relationships, depending on the setting value of a certain parameter (No. 100 in FIG. 9), the settable range of the related parameter (No. 200 in FIG. 9) may be changed, in some cases.

For example, Japanese Patent Application Laid-Open No. 09-062323 discloses a conventional technique related to the parameter setting. According to this technique, a table loaded with dependence relationships between system parameters of a numerical controller are prepared so that when a system parameter is to be changed, the value of another system parameter related to the system parameter concerned can be automatically set and displayed.

Furthermore, for example, Japanese Patent Applications Laid-Open Nos. 05-073103 and 2004-280589 disclose other conventional techniques related to the parameter setting. According to these techniques, when a parameter is being changed or is changed, another parameter related to this parameter is displayed.

If the settable range of the one parameter is changed by the value of related another parameter, an operator should check whether there are any other parameters related to the changed parameter in setting the parameter, and moreover, examine and set the setting range of the related parameter corresponding to the value of the changed parameter.

Thus, the operator will spend time on setting the parameter and may possibly make a mistake.

In the conventional technique disclosed in Japanese Patent Application Laid-Open No. 09-062323, on the other hand, no solution is disclosed or suggested for the change of the setting range of the other parameter related to the parameter with the changed set value, so that the operator cannot be supported for the setting range of the other parameter related to the parameter with the changed set value. Moreover, according to the conventional techniques disclosed in Japanese Patent Applications Laid-Open Nos. 05-073103 and 2004-280589, although the dependence relationships among the parameters can be notified to the operator, the operator cannot avoid the possibility of wrong setting if the settable range of one of the parameters is changed by the value of related parameter.

SUMMARY OF THE INVENTION

Accordingly, the object of the present invention is to provide a parameter setting support device capable of facilitating setting of another parameter related to a parameter set by an operator.

A parameter setting support device according to the present invention solves the above problems by preparing three tables, i.e., a function table, setting range table, and conditional expression table, as tables to be used for parameter setting, referring the tables upon set the parameter, identifying another parameters related to the set parameter and the setting range thereof, and providing support for setting the parameters based on the identified setting range.

One aspect of the present invention is a parameter setting support device configured to support parameter setting of a numerical controller, the parameter setting support device comprising a parameter setting interface unit configured to display an input screen for setting a parameter of a function of the numerical controller and accept the setting of the value of the parameter of the function to be set, a related parameter identification unit configured to identify a related function related to the parameter of the settable function, the value of which is set through the parameter setting interface unit, based on the relationship between the parameter and each function of the numerical controller, and a setting range identification unit configured to identify a setting range of the parameter of the related function related to the parameter of the settable function identified by the related parameter identification unit by calculating a conditional expression predetermined for the setting range of the parameter of the related function. The parameter setting interface unit displays the setting range of the parameter of the related function identified by the setting range identification unit.

According to the present invention, when a parameter is changed by an operator, the changed parameter and setting ranges of related parameters are displayed on a setting screen. In this way, the operator's mistakes in setting can be reduced.

BRIEF DESCRIPTION OF THE DRAWINGS

The above and other objects and features of the present invention will be obvious from the following description of embodiments with reference to the accompanying drawings, in which.

DETAILED DESCRIPTION OF THE PREFERRED EMBODIMENTS

The following is a description of a configuration example of a numerical controller for implementing the present invention. The configuration of the numerical controller of the present invention is not limited to the following example and any configuration may be used provided that it can achieve the object of the invention.

Figure 1:
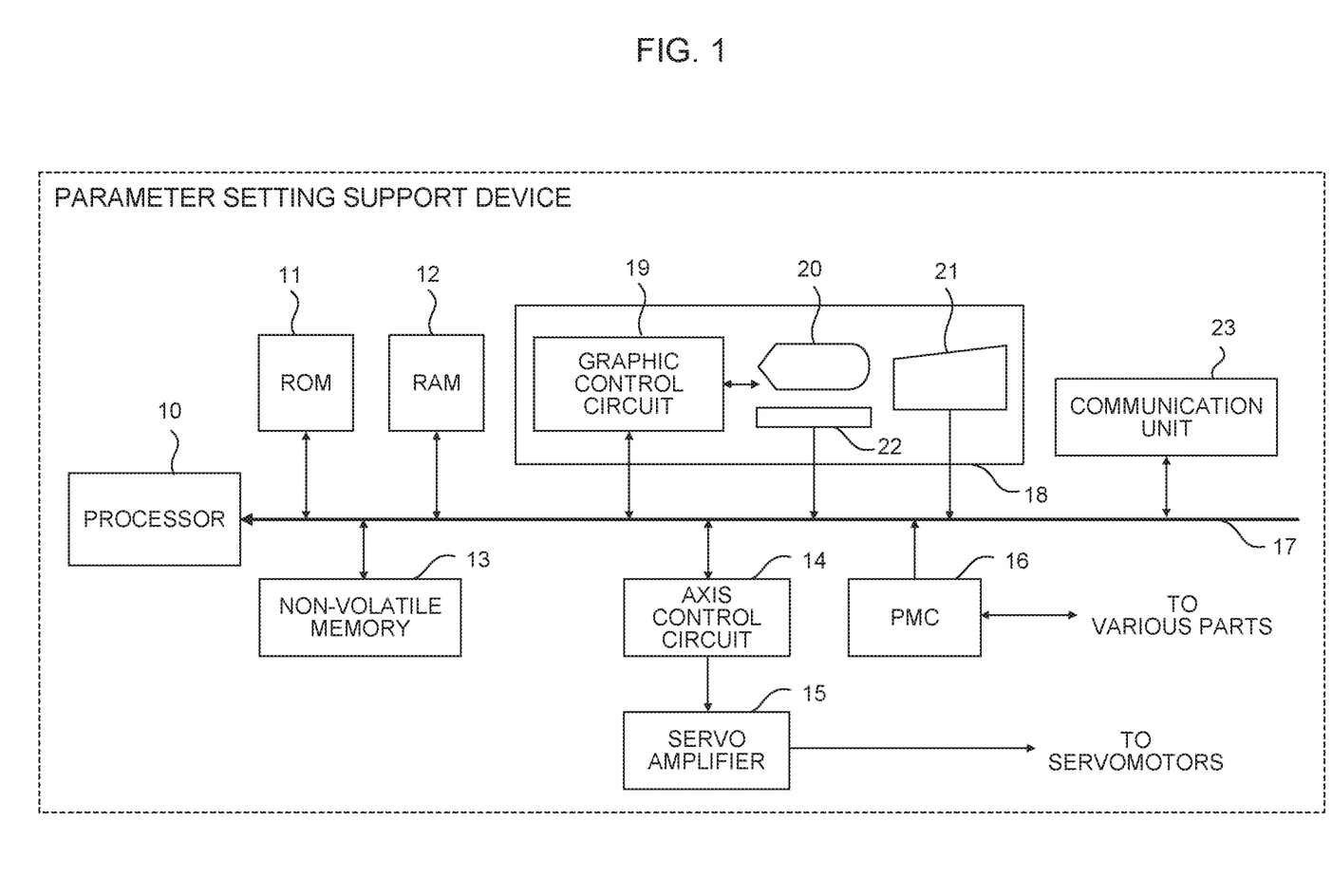
FIG. 1 is a schematic hardware configuration diagram showing principal parts of a parameter setting support device according to one embodiment.

FIG. 1 is a schematic hardware configuration diagram showing principal parts of a parameter setting support device according to one embodiment. A parameter setting support device 1 according to the present embodiment can be implemented as, for example, a numerical controller. Also, the parameter setting support device 1 according to the present embodiment can be implemented as, for example, a personal computer or a host computer. In the case where the parameter setting support device 1 is implemented as a personal computer or a host computer, set parameters may be transferred to the numerical controller through a storage medium such as a CF card or a wired or wireless network. FIG. 1 shows an example of a hardware configuration of the parameter setting support device 1 implemented as the numerical controller.

The parameter setting support device 1 is mainly composed of a processor 10. The processor 10 controls the entire parameter setting support device 1 according to a system program stored in a ROM 11. An EPROM, EEPROM or the like is used for the ROM 11.

A DRAM or the like is used for a RAM 12, which is stored with temporary calculation data, display data, input/output signals and the like. A CMOS or SRAM, which is backed up by a battery (not shown), is used for a non-volatile memory 13 and is stored with parameter setting and the like to be retained even after the power supply is turned off. Moreover, the non-volatile memory 13 is stored with log data (described later) related to the operation of the parameter setting support device 1.

A machine control panel 18 is disposed on the front surface or the like of the parameter setting support device 1 and is used for the display of data and graphics required for the operation of the parameter setting support device 1, for the reception of an operator's manual operation input, data input and the like, and for the operation of the parameter setting support device 1. A graphic control circuit 19 converts digital signals, such as numerical data and graphic data, into raster signals for display and deliver them to a display device 20, which displays these numerical values and graphics. A liquid-crystal display device is mainly used for the display device 20.

An input device 21 comprises a key switch, a rotary switch, a keyboard, which is provided with numeric keys, symbolic keys, character keys, and function keys, and a pointing device such as a mouse.

A touch panel 22 has a function of detecting the touching and dragging operations by the operator. The touch panel 22 is disposed superimposed on the screen of the display device 20. The operator can detect, by means of the touch panel 22, operations on software keys, software buttons, and software switches displayed on the screen of the display device 20. The touch panel 22 and the display device 20 may be combined into a single unit.

An axis control circuit 14 receives an axis movement command from the processor 10 and outputs the axis movement command to a servo amplifier 15. The servo amplifier 15 amplifies this movement command and drives servomotors connected respectively to each axis of a machine controlled by the parameter setting support device 1, thereby controls the relative motion of a tool attached to the machine and a workpiece. Moreover, each servomotor has a position/speed detector (not shown in FIG. 1) built-in, and a position/speed feedback signal from this position/speed detector is fed back to the axis control circuit 14. Although the axis control circuit 14 and the servo amplifier 15 are each shown for only one axis in FIG. 1, they are provided corresponding in number to the axes of the servomotor.

A PMC (programmable machine controller) 16 receives an M (auxiliary) function signal, S (spindle speed control) function signal, and T (tool selection) function signal and the like from the processor 10 through a bus 17. Then, the PMC 16 processes these signals according to a sequential program and delivers output signals, thereby controlling the operations of pneumatic devices, hydraulic devices, electromagnetic actuators and the like inside and outside the machine controlled by the parameter setting support device 1. Moreover, on receiving various signals from switches, sensors and the like installed in various parts in the machine controlled by the parameter setting support device 1, the PMC 16 performs sequential processing and transfers necessary input signals to the processor 10 through the bus 17.

Figure 2:
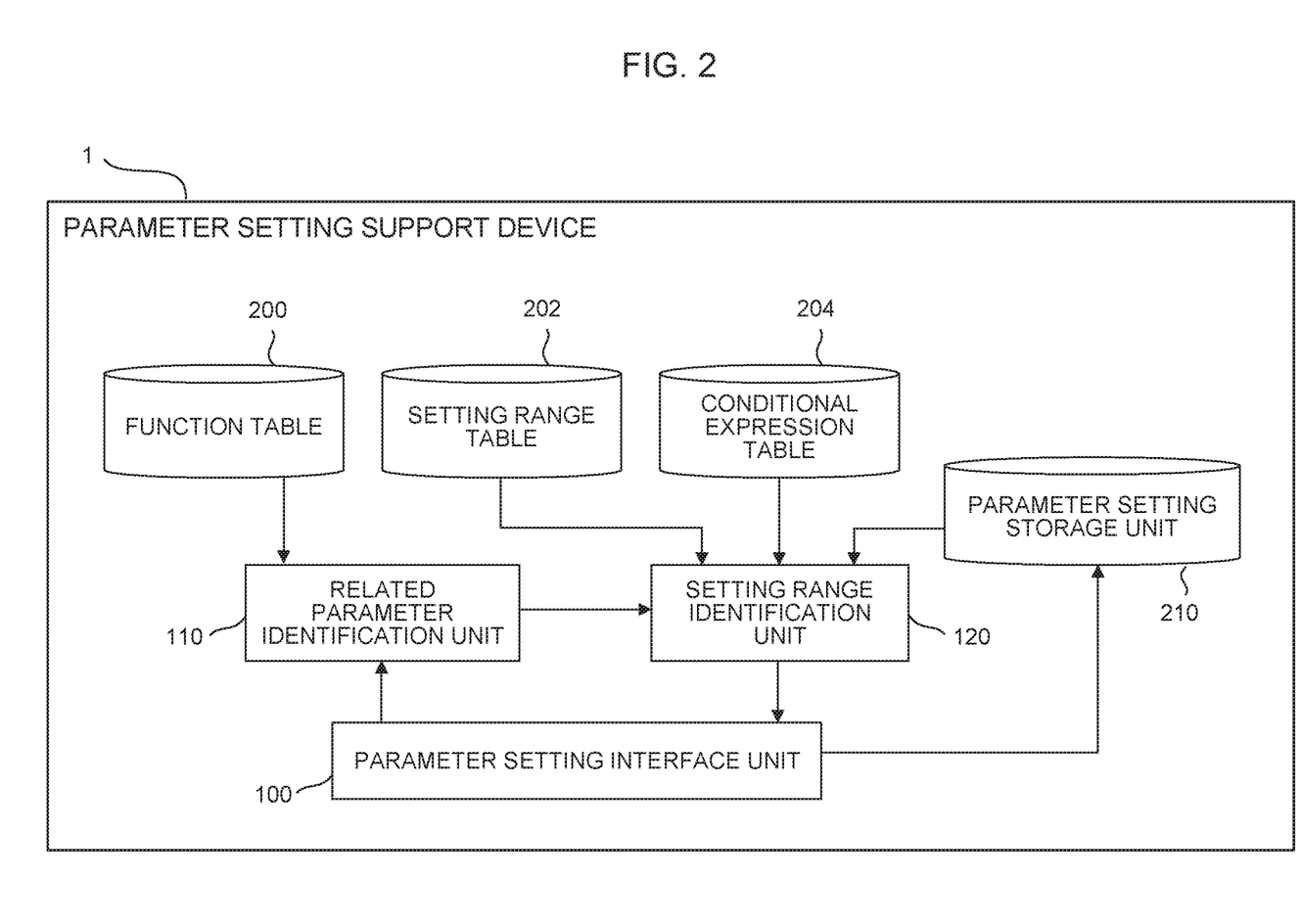
FIG. 2 is a schematic functional block diagram of the parameter setting support device according to the one embodiment.

FIG. 2 is a schematic functional block diagram showing principal parts of the parameter setting support device according to the one embodiment of the present invention, in which a system program for implementing a parameter setting support function of the present invention is performed on the parameter setting support device 1 shown in FIG. 1. Functional blocks shown in FIG. 2 are implemented as the processor 10 of the parameter setting support device 1 shown in FIG. 1 performs the system program for the parameter setting support function to control the operations of various parts of the parameter setting support device 1. The parameter setting support device 1 of the present embodiment comprises a parameter setting interface unit 100, a related parameter identification unit 110, and setting range identification unit 120. Moreover, a function table 200, setting range table 202, conditional expression table 204, and parameter setting storage unit 210 for storing set values of parameters are secured on the non-volatile memory 13.

The parameter setting interface unit 100 can be constructed, for example, as a function of the processor 10. Alternatively, the parameter setting interface unit 100 can be constructed, for example, as a software stored in the ROM 11 configured to make the processor 10 function. The parameter setting interface unit 100 is a function means for displaying on the display device 20 of the machine control panel 18 an input screen for setting the values of the parameters of each function of the numerical controller, based on the operator's operation, and accepting a set value for a parameter of a predetermined function input by the input device 21 or the like through the input screen. The set value for the parameter of the function to be set accepted by the parameter setting interface unit through the input screen is stored in an area that stores the set values of the parameters of the settable functions stored in the parameter setting storage unit 210. Moreover, the parameter setting interface unit 100 outputs the settable function (function ID) accepted through the input screen, the parameter (parameter number) of the function concerned, and the set value for the parameter concerned to the related parameter identification unit 110.

The related parameter identification unit 110 can be constructed, for example, as a function of the processor 10. Alternatively, the parameter setting interface unit 100 can be constructed, for example, as software stored in the ROM 11 and configured to make the processor 10 function. Based on the settable function received from the parameter setting interface unit 100 and the parameter of the function concerned, the related parameter identification unit 110 retrieves a related function in association with the setting function.

Figure 3:
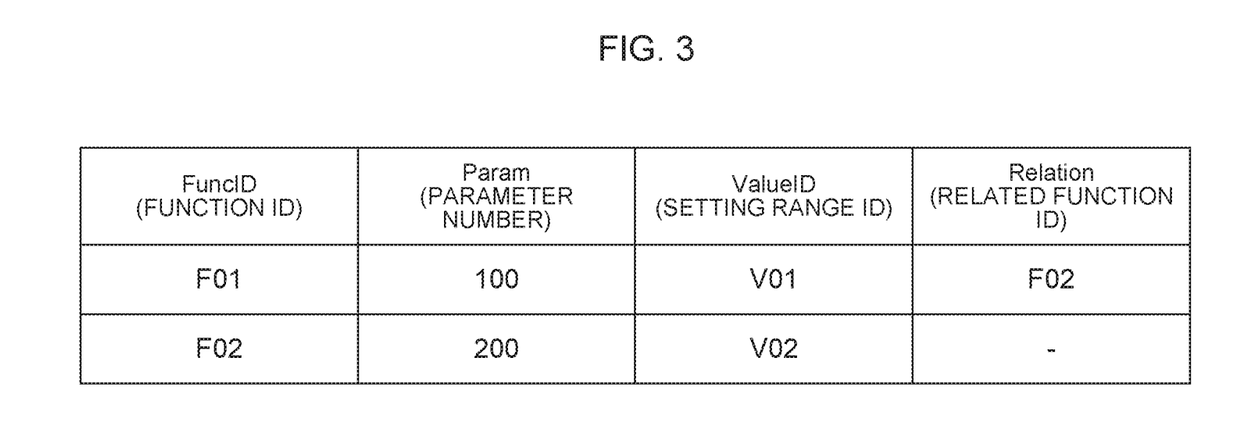
FIG. 3 is a diagram showing an example of a function table according to the one embodiment.

FIG. 3 is a diagram showing an example of the function table. The function table 200 is a table that defines the relationships between the parameters and each function of the numerical controller for setting the parameters. The function table 200 illustrated in FIG. 3 is stored with function data as a set including function IDs for uniquely identifying the functions of the numerical controller, parameter numbers of necessary parameters for the functions, setting range IDs for uniquely identifying the setting ranges of the parameters, and a related function ID for identifying the related function. In the function data stored in the function table 200, a plurality of parameters (parameter numbers) can correspond to a single function (function ID). In this case, a plurality of function data individually having one and the same function ID and different parameter numbers can be stored in the function table 200.

Based on the function received from the parameter setting interface unit 100 and the parameter of the function concerned, the related parameter identification unit 110 retrieves the function IDs and the parameter numbers in the function table, thereby identifying function data related to the parameter of the function set by the operator. Then, the related parameter identification unit 110 acquires the related function ID from the function data related to the parameter of the retrieved settable function and retrieves the function table again on the basis of the acquired related function ID, thereby acquiring function data on the function related to the parameter of the function set by the operator. Moreover, the related parameter identification unit 110 outputs, to the setting range identification unit 120, the settable function received from the parameter setting interface unit 100, the parameter of the function concerned, and the set value for the parameter concerned, and the function data on the related function retrieved from the function table 200. If the related function ID is not set in the function data on the function to be set by the operator, the related parameter identification unit 110 does not output values to the setting range identification unit 120, assuming that there is no other function related to the function to be set by the operator. Furthermore, if the related function has a plurality of parameters, the related parameter identification unit 110 outputs the respective function data of the parameters of the related function to the setting range identification unit 120.

The setting range identification unit 120 can be constructed, for example, as a function of the processor 10. Alternatively, the parameter setting interface unit 100 can be constructed, for example, as software stored in the ROM 11 and configured to make the processor 10 function. Based on the settable function received from the related parameter identification unit 110, the parameter of the settable function, the set value for the parameter, and the function data on the related function in association with the function concerned, the setting range identification unit 120 identifies the setting range of the parameter of the related function by using the setting range table 202 and the conditional expression table 204.

Figure 4:
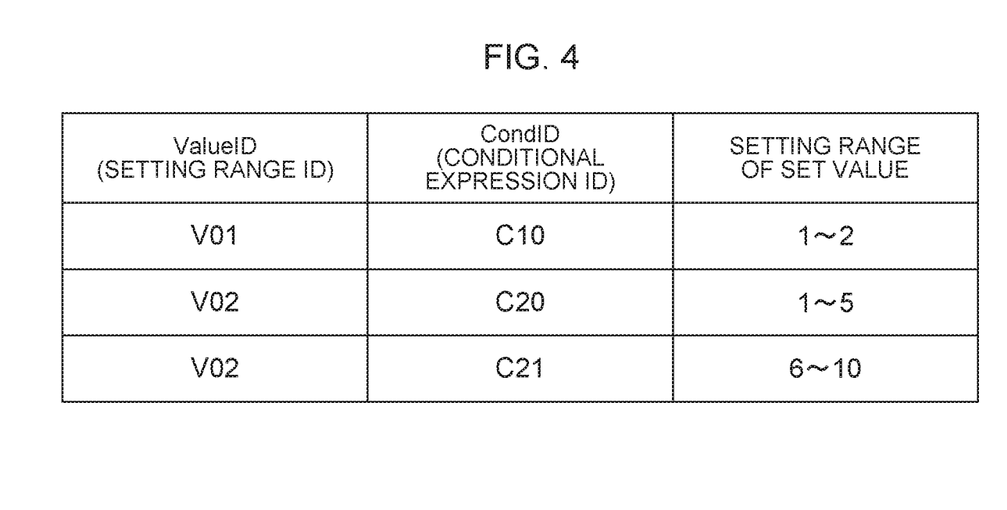
FIG. 4 is a diagram showing an example of a setting range table according to the one embodiment.

FIG. 4 is a diagram showing an example of the setting range table. The setting range table 202 is a table that defines the setting ranges of the parameters. The setting range table 202 illustrated in FIG. 4 is stored with setting range data as a set including setting range IDs for uniquely identifying the setting ranges, conditional expression IDs for uniquely identifying conditional expressions that enable the setting ranges, and the setting ranges of the set values. The setting ranges of the set values included in the setting range data may be ranges of continuous values defined respectively by their upper and lower limits, a list of selectable values (e.g., (1, 3, 5, 7), etc.) of finite elements of numerical values, a list of selectable values (e.g., (ON, OFF), (X-axis, Y-axis, Z-axis), etc.) of finite elements of characters, ranges of logical values, or the like, and may be in any form that enables an appropriate representation of possible ranges for the set values of the parameters.

Figure 5:
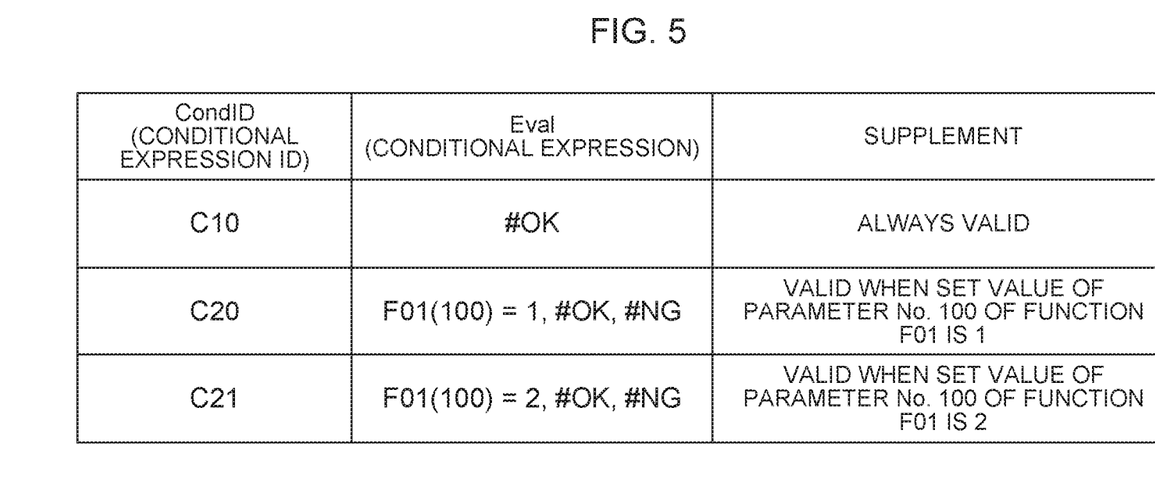
FIG. 5 is a diagram showing an example of a conditional expression table according to the one embodiment.

FIG. 5 is a diagram showing an example of the conditional expression table. The conditional expression table 204 is a table that defines conditions that enable the setting ranges of the parameters. The conditional expression table 204 illustrated in FIG. 5 is stored with conditional expression IDs for uniquely identifying the conditional expressions that enable the setting ranges and conditional expression data as a conditional expression set that enables the setting ranges. The conditional expressions illustrated in FIG. 5 are in a form "logical operational expression, symbol for establishment of logical operational expression, symbol for failure of logical operational expression" such that the conditional expressions are valid if the symbol of the arithmetic result of the logical operational expression is #OK and that the conditional expressions are invalid if the symbol of the arithmetic result is #NG. The form of the conditional expressions is not limited to this and conditional expressions of any form can be employed only if the valid/invalid determination can be performed based on the set values of the parameters of the functions and other values that can be acquired in the numerical controller.

Upon received from the related parameter identification unit 110 the settable function, the parameter of the function concerned, the set value for the parameter concerned, and the function data on the related function in association with the function concerned, the setting range identification unit 120 retrieves the setting range table 202 by using the setting range ID of the related function included in the function data of the related function concerned and identifies at least one conditional expression ID for deciding a condition that enables the setting range of the related function. Then, the setting range identification unit 120 retrieves the conditional expression table 204 by using the identified conditional expression ID or IDs and acquires a conditional expression or expressions corresponding to the conditional expression ID or IDs. Moreover, the setting range identification unit 120 performs a logical operation for each conditional expression by using the set value for the parameter of the settable function received from the related parameter identification unit 110, the parameter values of the set functions stored in the parameter setting storage unit 210, and the like. Then, the setting range identification unit 120 outputs, as valid setting ranges, the setting ranges of the set values included in the setting range data corresponding to the conditional expression IDs that enable the logical operation results to the parameter setting interface unit 100, along with the function ID of the related function and the parameter number of the parameter of the related function concerned.

Moreover, upon received the function ID of the related function, the parameter number of the parameter of the related function concerned, and the setting range of the parameter concerned from the setting range identification unit 120, the parameter setting interface unit 100 presents the setting range for the related function to the operator. This can be effected for example by displaying it near a display of the parameter of the related function, on the input screen for setting the parameter value of each function.

The operations of the above-mentioned function unit in a case where the operator changed the value of a parameter number 100 of a function F01 from 1 to 2 through the parameter setting interface unit 100 will now be described as follows. The function table 200, setting range table 202, and conditional expression table 204 are supposed to be stored with the data illustrated in FIGS. 3 to 5.

[Step SA01] The related parameter identification unit 110 retrieves the function F01 from the function table 200 and identifies that functions related to the function F01 include a function F02. Moreover, the related parameter identification unit 110 identifies that the setting range ID of the function F02 and the parameter number to be set are V02 and 200, respectively. The related parameter identification unit 110 outputs these pieces of information to the setting range identification unit 120.

[Step SA02] The setting range identification unit 120 retrieves the setting range table 202 by the setting range ID: V02 of the function F02 (related function) and acquires two setting range data.

In this way, the setting range identification unit 120 identifies that there are two setting ranges of the function F02; 1 to 5 for a case where a conditional expression of a conditional expression ID: C20 is valid and 6 to 10 for a case where a conditional expression of a conditional expression ID: C21 is valid.

[Step SA03] The setting range identification unit 120 retrieves and acquires respective conditional expression data on the conditional expression IDs: C20 and C21 from the conditional expression table 204 and executes a logical operation for each conditional expression. Consequently, the setting range identification unit 120 determines that the conditional expression of the conditional expression ID: C21 is valid and that the setting range of the function F02 (or the parameter of the parameter number 200 thereof) is 6 to 10, and outputs this determination result to the parameter setting interface unit 100.

[Step SA04] The parameter setting interface unit 100 displays this setting range on the input screen for setting the parameter values of the functions.

A practical example of a more specific parameter setting support will now be described with reference to FIGS. 6 to 8.

Figure 6:
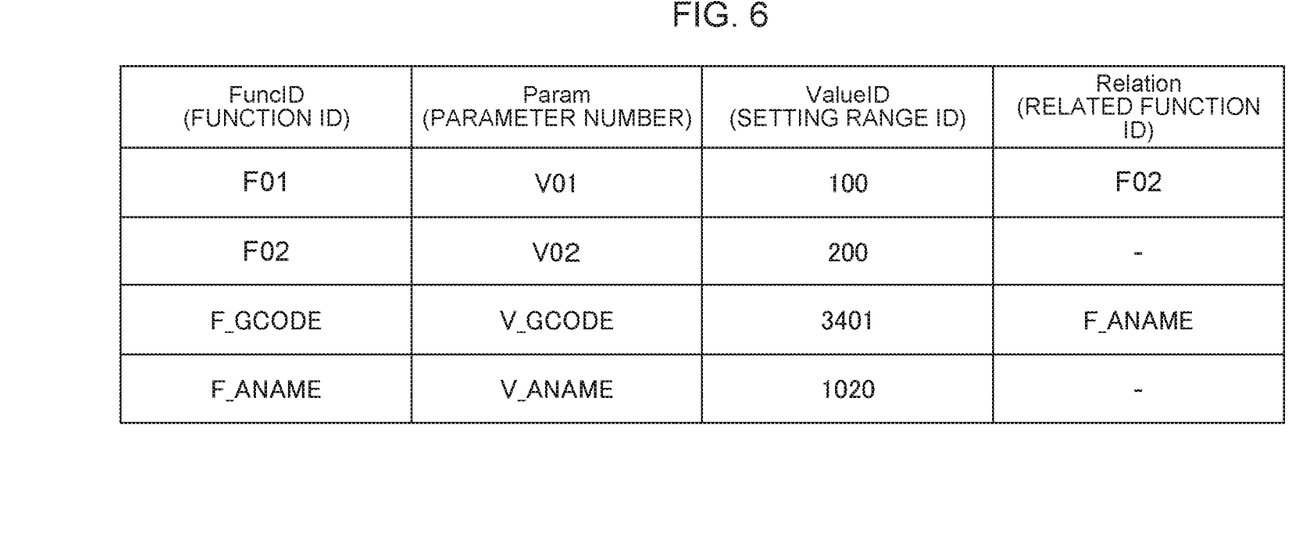
FIG. 6 is a diagram showing a function table according to one practical example.

FIG. 6 shows an example of a function table used in this practical example. A function for setting a G-code system used in the parameter setting support device 1 (function ID=F_GCODE, parameter number=V_GCODE, setting range ID=3401), and a function for setting axes (function ID=F_ANAME, parameter number=V_ANAME, setting range ID=1020) are added to the function table shown in FIG. 6. Moreover, the axis setting function is set as a function related to the function for setting the G-code system.

Figure 7:
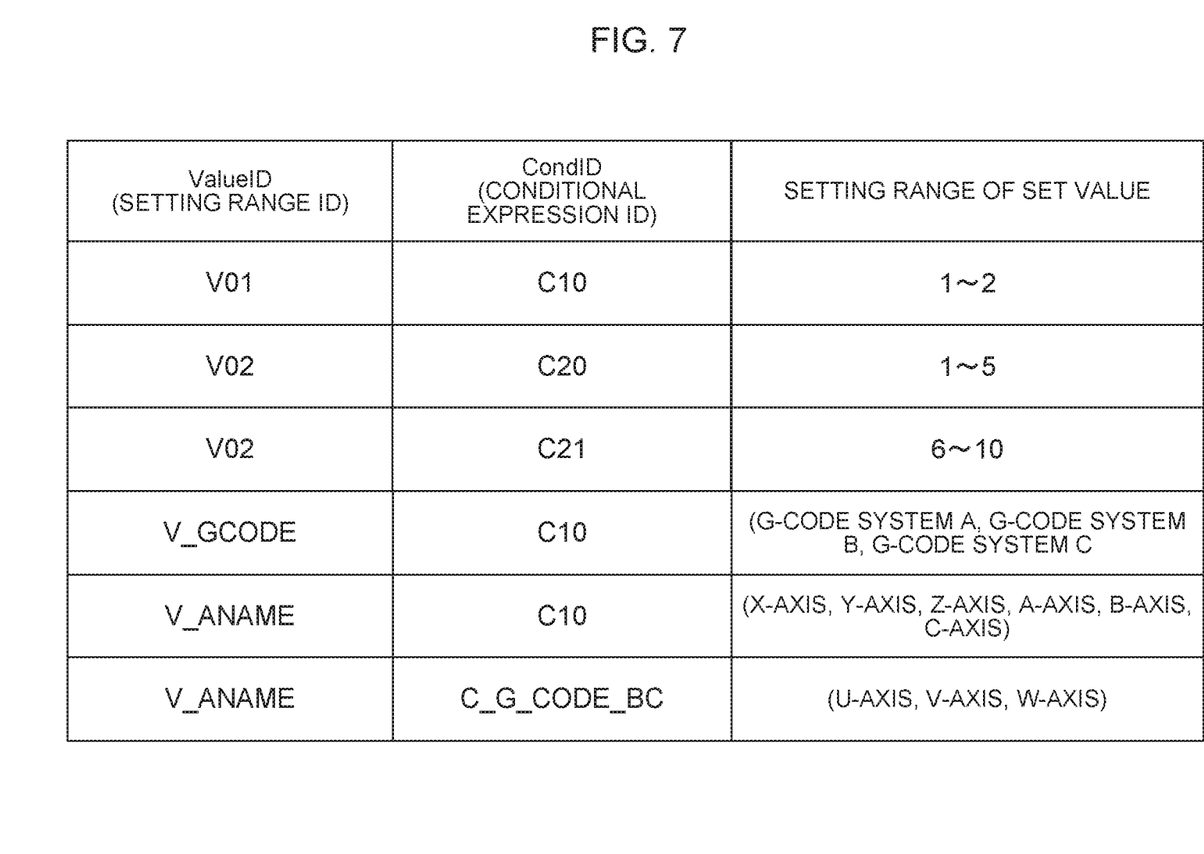
FIG. 7 is a diagram showing a setting range table according to the one practical example.

FIG. 7 shows an example of a setting range table used in this practical example. One setting range for the function for setting the G-code system (setting range ID=V_GCODE, conditional expression ID=C10, setting range data=(G-code system A, G-code system B, G-code system C)) and two setting ranges for the axis setting function (setting range ID=V_ANAME, conditional expression ID=C10, setting range data=(X-axis, Y-axis, Z-axis, A-axis, B-axis, C-axis) and setting range ID=V_ANAME, conditional expression ID=C_G_CODE_BC, setting range data=(U-axis, V-axis, W-axis)) are added to the setting range table shown in FIG. 7. The setting ranges for the axis setting function imply that the X-axis, Y-axis, Z-axis, A-axis, B-axis, and C-axis can be set as the axes if the conditional expression ID=C10 is established and that the U-axis, V-axis, and W-axis can also be set if the conditional expression ID=C_G_CODE_BC is established.

Figure 8:
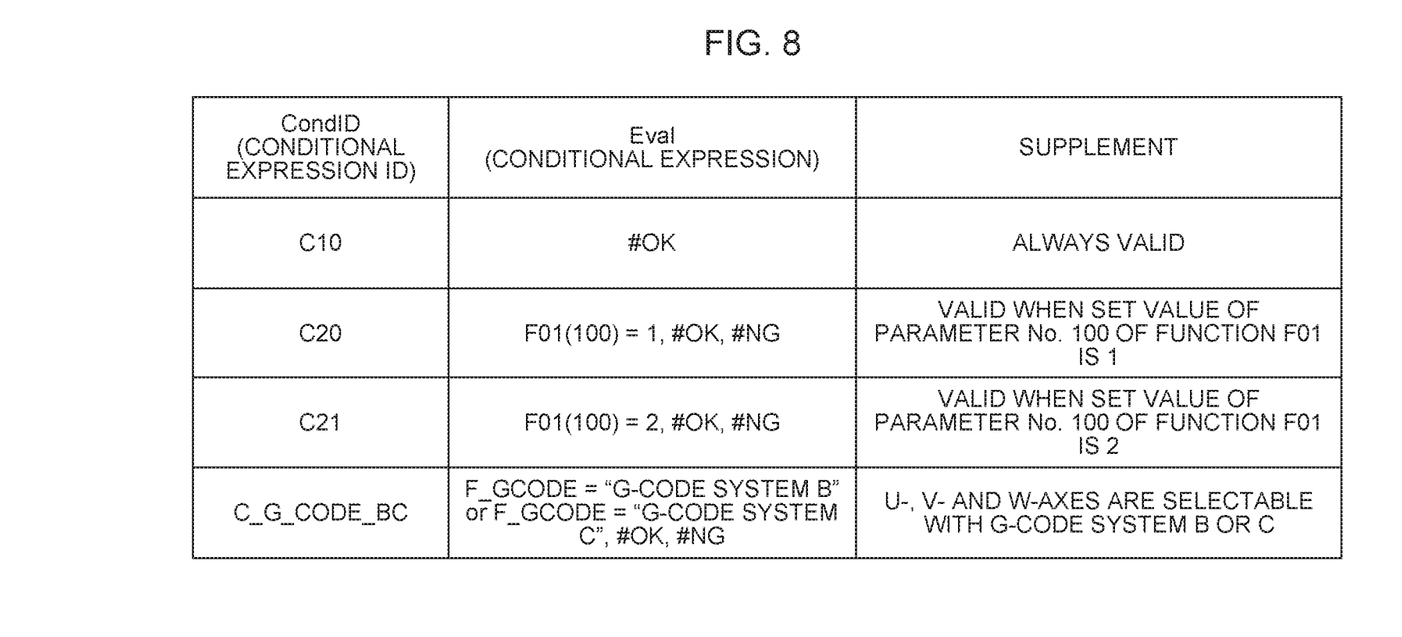
FIG. 8 is a diagram showing a conditional expression table according to the one practical example.

FIG. 8 shows an example of a conditional expression table used in this practical example. In the conditional expression table shown in FIG. 8, a conditional expression (conditional expression ID=C_G_CODE_BC, conditional expression='F_GCODE="G-code system B" or F_GCODE="G-code system C", #OK, #NG') used to determine the setting range of the axis setting function is added supplementary. The added conditional expression used to determine the setting range of the axis setting function is valid if the G-code system is set to be the G-code system B or the G-code system C.

Thus, under the condition that the function table 200, setting range table 202, and conditional expression table 204 are set in place, if the operator changes the value of the parameter number 3401 of the function for setting the G-code system from "G-code system A" to "G-code system B" through the parameter setting interface unit 100, parameter setting support processing by the parameter setting support device 1 is executed in the following steps of procedure.

[Step SB01] The related parameter identification unit 110 retrieves the function (F_GCODE) for setting the G-code system from the function table 200, and identifies that the axis setting function (F_ANAME) is included in functions related to the function for setting the G-code system. Moreover, the related parameter identification unit 110 identifies that the setting range ID of the axis setting function is V_ANAME and the parameter number to be set is 1020, respectively. The related parameter identification unit 110 outputs these pieces of information to the setting range identification unit 120.

[Step SB02] The setting range identification unit 120 retrieves the setting range table 202 by the setting range ID: V_ANAME of the axis setting function (and its related function) and acquires two setting range data. In this way, the setting range identification unit 120 identifies that there are two setting ranges for the axis setting function, i.e. the setting range for a case where the conditional expression of the conditional expression ID: C10 is valid regarding (X-axis, Y-axis, Z-axis, A-axis, B-axis, C-axis), and for a case where the conditional expression of the conditional expression ID: C_G_CODE_BC is valid regarding (U-axis, V-axis, W-axis).

[Step SB03] The setting range identification unit 120 retrieves and acquires from the conditional expression table 204 respective conditional expression data on the conditional expression IDs: C10 and C_G_CODE_BC, and executes a logical operation for each conditional expression. Consequently, the setting range identification unit 120 determines that the conditional expression ID: C10 is valid and that the conditional expression ID: C_G_CODE_BC is also valid, determines that the setting range of the axis setting function (or the parameter of the parameter number 1020 thereof) is a range (X-axis, Y-axis, Z-axis, A-axis, B-axis, C-axis, U-axis, V-axis, W-axis), and outputs this result to the parameter setting interface unit 100.

[Step SB04] The parameter setting interface unit 100 displays this setting range on the input screen for setting the parameter values of the functions.

While an embodiment of the present invention has been described herein, the invention is not limited to the above-described embodiment and may be suitably modified and embodied in various forms.

When the value of the parameter of the function is set by the operator in the above-described embodiment, for example, the parameter setting interface unit 100 is expected to display the setting range of the parameter of the related function related to the function concerned on the input screen for setting the parameter values of the functions. However, the setting range of the parameter of this related function may be displayed in any form that can be ascertained by the operator. For example, the setting range may be displayed beside a setting field for the parameter or dynamic display may be performed such that the setting range is displayed below the screen with a focus on the parameter setting field or the setting range is displayed in the so-called balloon-help form. Alternatively, the setting range may be displayed as an alert when a value outside the setting range is entered in the parameter setting field for the related function by the operator.

The setting range table 202 may be further provided with an InitValue (initial value) column in which an initial value can be set. In this way, the initial value concerned can be acquired and used for a parameter value of a function that is not yet set in the parameter setting storage unit 210 as the setting range identification unit 120 performs the logical operation of a conditional expression included in the conditional expression data stored in the conditional expression table 204.

Moreover, the setting range identification unit 120 may be configured to command the parameter setting interface unit 100 to display an alert on the input screen if the value of the parameter of the related function related to the parameter value of the function set by the operator is already set and if the set parameter value of the related function is outside the setting range identified for the parameter of the related function related to the function concerned. When this is done, the parameter setting interface unit 100 presents, to the operator, the relationship between the parameter value of the function set by the operator and the setting range of the parameter of the related function related to the function concerned. Also, the parameter setting interface unit 100 may be configured to urge the operator to select whether to change the parameter value of the related function so as to fall within the setting range or to reset the parameter value of the function set by the operator to a value compatible with the value currently set for the parameter of the related function. By providing this function, if the parameter value of the function to be set by the operator is wrong, it can be notified to the operator to encourage him/her to set a correct value.

Furthermore, in the above-described embodiment, the function table 200, setting range table 202, and conditional expression table 204 are illustrated as being provided on the parameter setting support device 1. However, these tables need not always be provided on the parameter setting support device 1 and should only be provided in any referable positions for the parameter setting support device 1, e.g., on an external storage device, any other devices on networks, and the like. Moreover, the function table 200, setting range table 202, and conditional expression table 204 can be modified within a designable range only if their data structures are equivalent in view of the data base design. For example, these tables may be constructed as a single table or divided into more tables.

While embodiments of the present invention have been described herein, the invention is not limited to the above-described embodiments and may be suitably modified and embodied in other forms.7

The invention claimed is:

1. A parameter setting support device for a numerical controller configured to control a machine tool, the parameter setting support device comprising:
   a display; and
   a processor configured to
      cause the display to display an input screen for setting a parameter of a function of the numerical controller,
      accept, via the input screen, a value of the parameter of the function,
      identify a related function of the numerical controller, wherein the related function is related to the parameter of the function, and wherein a value of the identified related function is set based on a relationship between the parameter of the function and the related function of the numerical controller, and
      identify a setting range of a parameter of the identified related function by calculating a predetermined conditional expression for the setting range of the parameter of the identified related function,
   wherein the processor is configured to cause the display to display the setting range of the parameter of the identified related function, and
   the numerical controller is configured to use the setting range of the parameter of the identified related function to control the machine tool.

2. The parameter setting support device according to claim 1, wherein
   the processor is configured to, in response to the value of the parameter of the function being accepted via the input screen, retrieve a table which defines the relationship between the parameter of the function and the related function of the numerical controller, for identifying the related function related to the parameter of the function based on the table.

3. The parameter setting support device according to claim 1, wherein
   the processor is configured to determine a validity of the predetermined conditional expression for the setting range of the parameter of the identified related function based on a table, wherein the table includes a logical operation expression for calculating the predetermined conditional expression.

4. The parameter setting support device according to claim 1, wherein
   the processor is configured to, in response to the value of the identified related function being outside of the setting range,
      cause the display to display a relationship between the value of the parameter of the function and the setting range of the parameter of the identified related function, and
      prompt a user to select whether to change the value of the identified related function to fall within the setting range.

5. The parameter setting support device according to claim 1, wherein the processor is configured to, in response to the value of the identified related function being outside of the setting range,
    cause the display to display a relationship between the value of the parameter of the function and the setting range of the parameter of the identified related function, and
    reset the value of the parameter of the function.

\* \* \* \* \*